United States Patent
Koch et al.

(10) Patent No.: US 7,628,232 B2
(45) Date of Patent: Dec. 8, 2009

(54) ROTARY-PERCUSSION DRILL WITH A FOUR-START HELICAL SHAFT

(75) Inventors: Olaf Koch, Kaufering (DE); Josef Starkmann, Hurlach (DE); Guenther Domani, Frastanz (AT)

(73) Assignee: Hilti Aktiengesellschaft, Schaan (LI)

( * ) Notice: Subject to any disclaimer, the term of this patent is extended or adjusted under 35 U.S.C. 154(b) by 184 days.

(21) Appl. No.: 11/796,737

(22) Filed: Apr. 27, 2007

(65) Prior Publication Data

US 2007/0251734 A1 Nov. 1, 2007

(30) Foreign Application Priority Data

Apr. 28, 2006 (DE) .................... 10 2006 000 208

(51) Int. Cl.
*E21B 10/44* (2006.01)
(52) U.S. Cl. .................... 175/394; 175/323; 408/230
(58) Field of Classification Search ............... 175/323, 175/395, 414, 394; 408/226, 227, 230; D15/139; 299/87.1

See application file for complete search history.

(56) References Cited

U.S. PATENT DOCUMENTS

| 2,673,716 | A | 3/1954 | Avery |
| 2,895,355 | A | 7/1959 | Kleine et al. |
| 4,749,051 | A | 6/1988 | Larsson |
| 5,553,682 | A | 9/1996 | Batliner |
| 6,601,659 | B2 * | 8/2003 | Saitta et al. .................. 175/323 |
| 7,097,396 | B1 * | 8/2006 | Miyanaga .................... 408/144 |

FOREIGN PATENT DOCUMENTS

| DE | 206517 C | 5/1909 |
| DE | 9319009 | 3/1994 |
| DE | 4419641 A1 | 12/1995 |
| DE | 9915304 | 9/2000 |

* cited by examiner

*Primary Examiner*—David J Bagnell
*Assistant Examiner*—Robert E Fuller
(74) *Attorney, Agent, or Firm*—Abelman, Frayne & Schwab

(57) ABSTRACT

A rotary-percussion drill includes a four-start helical shaft (3) having a fourfold rotationally and mirror-symmetrical helix cross-section, with radially projecting convexly formed helical webs (4) extending from a concave groove bottom (5) up to the envelope circle (6) and having an undercut (7) with respect to a web width (S).

10 Claims, 1 Drawing Sheet

ROTARY-PERCUSSION DRILL WITH A FOUR-START HELICAL SHAFT

BACKGROUND OF THE INVENTION

1. Field of the Invention

The present invention relates to a rotary-percussion drill for forming holes in a stone material, preferably, having a diameter in a range from 3 to 45 mm, and which is used with a rotary-percussion hand-held power tool and has a four-start helical shaft.

2. Description of the Prior Art

Four-start helical shafts of rotary-percussion drills usually have a helix cross-section having a fourfold rotational and mirror symmetry, with radially projecting helical webs extending from concave groove bottoms, tapering radially outwardly, according to German Publication DE 4419641, or having the same width according to U.S. Pat. No. 2,673,716.

U.S. Pat. No. 4,749,051 discloses a four-start drill helical shaft with a helix cross-section having a fourfold rotational and mirror symmetry and in which radially projecting helical webs, which extend from concave groove bottoms, pass into envelope circle arcs of the helix envelope circle.

U.S. Pat. No. 2,895,355 discloses a four-staff helical shaft of a boring bar having a helix cross-section with a four-fold rotational and mirror symmetry with concave groove bottoms and convex arc-shaped helical webs which, according to German Patent No. 206,517 can be elliptically formed and have an undercut with respect to their web width.

The helix cross-section geometry of the drill helical shaft has a substantial influence on the spectrum of characteristics of a rotary percussion drill which, when used in an hand-held power tool, should meet numerous requirements. Without naming them all, at a predetermined boundary conditions (helix diameter, impact energy, torque, bending torque, drill material) of the used drill use, e.g., mass, volumetric displacement capacity, frictional coefficient, break resistance, acoustic impedance, torsional stiffness, and mean value, as well as variations of the bending stiffness, should all be matched with each other.

Accordingly, an object of the present invention is to provide a four-start helical shaft for a rotary-percussion drill which would have an optimal spectrum of characteristics for use with a hand-held power tool.

SUMMARY OF THE INVENTION

This and other objects of the present invention, which will become apparent hereinafter, are achieved by providing a rotary-percussion drill including a four-start helical shaft having a fourfold rotationally and mirror-symmetrical helix cross-section and radially projecting convex helical webs extending from a bottom of a concave groove up to the envelope circle and having an undercut with respect to a web width.

The undercut between the concave groove bottom and the convex helical web results, in addition to the increase of the cross-sectional surface of the helical web at an integration over the cross-section, in local maxima of the integration contribution in the outer radial region, which overproportionally (with a square of the radius) enters in geometrical moments of inertia. Thus, the values of the torsional stiffness and of the bending stiffness increase also overproportionally. Thereby, the cross-sectional surface, and therefore, the mass can be reduced. This leads to reduced weight and saving of material of this mass-produced product.

Advantageously, an inner circle inscribed in the helix cross-section, has an inner circle radius that amounts from one/third to two/third of envelope circle radius, preferably, to one/half of the envelope circle radius. This insures a sufficiently good transmission of the impact energy.

Advantageously, the undercut has an undercut radius in a range from a half to two/third of a radius of the envelope circle, preferably, of three/fourth of the envelope circle radius, which suitably increase the helical web surface.

Advantageously, the groove bottom has a groove bottom radius in a range from one/third to two/third of radius of the envelope circle, preferably, of a half of the envelope circle radius which provides for a less curved helical web to which the displaceable removable drillings poorly adhere.

Advantageously, the radially outer rim of a helical web has a width in a range form one/eighth to one/sixth of a radius of the envelope circle. This permits to achieve a satisfactory guidance of the drill helix along the bore wall.

Advantageously, a radially outer rim of a helical web coincides with the arc of the envelope circle. This insures a non-abrasive, flat guidance of the drill helix along the bore wall.

Advantageously, a web flank between the concave groove bottom and the radially outer rim-forming, envelope circle arc is formed convex. This prevents appearance of sharp edges when the rim curvature changes in the bore helix.

Advantageously, the groove bottom passes smoothly (without fissures) into the flank. This prevents appearance of set break points so that the break strength of the drill helix increases.

Advantageously, the flank has a flank radius in a range from one/fourth to a half, preferably, of one/third of the envelope circle radius. This insures that at a sufficient we width of the helical web at the undercut, there remains, radially outwardly, a rim width the friction of which against the bore wall can be tolerated. Advantageously, the lead of the helical web to the drill axis is in a range from 45° to 55° and amounts, preferably to 48°. Thereby, a high speed of delivery of drillings is achieved, without clogging the helix grooves.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

DETAILED DESCRIPTION OF THE PREFERRED EMBODIMENT

Figure 1:
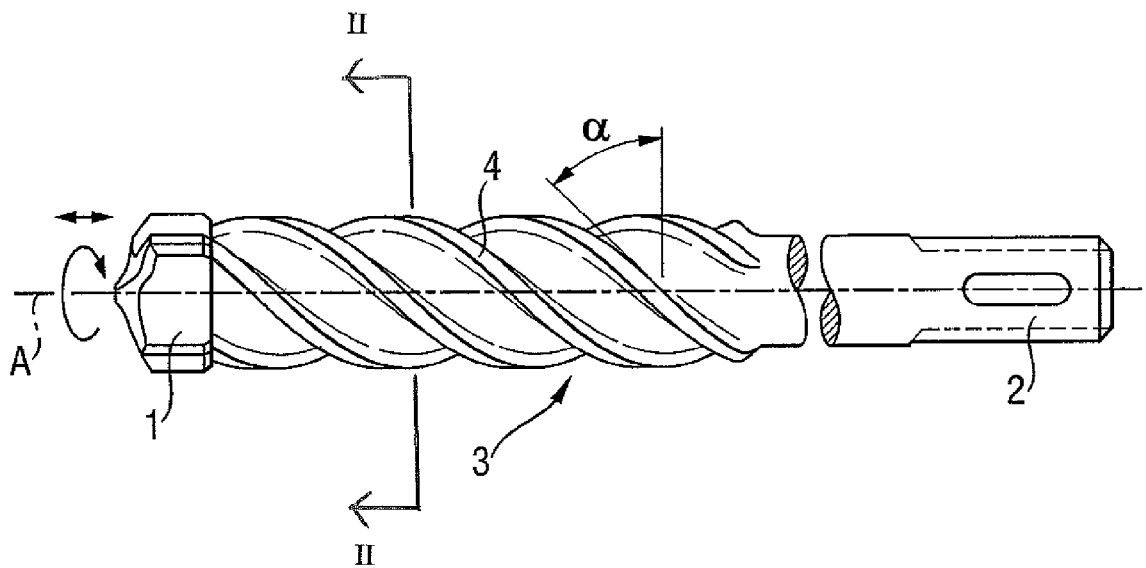
FIG. 1 a side view of a rotary-percussion drill according to the present invention.

A rotary-percussion drill according to the present invention for forming holes in a stone material, which is shown in FIG. 1, has a drilling head 1 which is formed as an obtuse solid, hard material head, a shank 2, and a four-start helical shaft 3 which is provided between the drilling head 1 and the shank 2 and on which the drilling head 1 is soldered. The helical shaft 3 has four helical webs 4 arranged each with a lead α of 48° with respect to the drill axis A.

Figure 2:
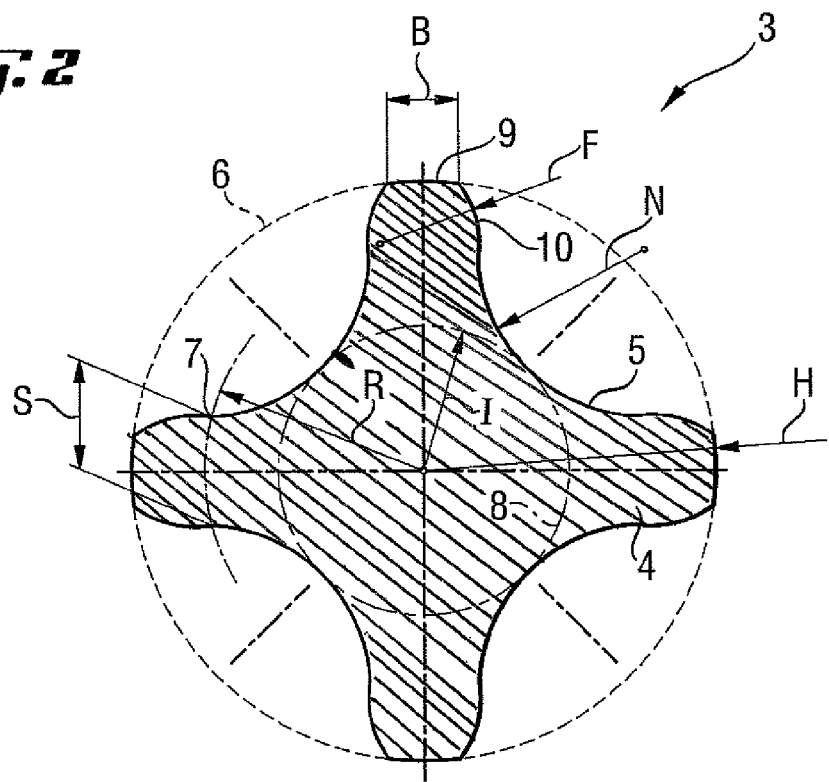
FIG. 2a cross-sectional view of the drill along lines II-II shown in FIG. 1.

According to FIG. 2, a cross-section of the helical shaft 3 along lines II-II in FIG. 1 is shown, illustrating that the cross-section is fourfold rotationally and mirror symmetrical, with radially projecting helical webs 4 being convexly formed from a groove bottom 5 up to an envelope circle 6 having a radius H, and with helical webs 4 forming an undercut 7 with respect to the web width S. An inner circle 8, which is inscribed in the helix cross-section, has a radius I equal to a half of the radius H of the envelope circle 6. The undercut 7 has an undercut radius R equal to three/fourth of the envelope circle radius H. The concave groove bottom 5 has a radius N equal to about sevententh of the envelope circle radius H, whereby the helical web 4 passes smoothly into an envelope circle arc 9. Between the concave bottom 5 and the envelope circle arc 9, a convex flank 10 is formed that passes into the groove bottom 5. The flank 10 has a radius F equal to one/third of the envelope circle radius H.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A rotary-percussion drill shaft, comprising a four-start helical shaft (3) having a fourfold rotationally and mirror-symmetrical helix cross-section, with radially projecting helical webs (4) being convexly formed from a concave groove bottom (5) with each helical web (4) radially extending to an envelope circle (6) and having an undercut (7) with respect to a web width (S).

2. A rotary-percussion drill shaft according to claim 1, wherein an inner circle (8), inscribed in the helix cross-section, has an inner circle radius (I) in a range of from one/third to two-third of envelope circle radius (H).

3. A rotary-percussion drill shaft according to claim 1, wherein the undercut (7) has an undercut radius (R) in a range from a half to two/third of a radius (H) of the envelope circle (8).

4. A rotary-percussion drill shaft according to claim 1, wherein the groove bottom (5) has a groove bottom radius (N) in a range from one/third to two/third of radius (H) of the envelope circle (8).

5. A rotary-percussion drill shaft according to claim 1, wherein a radially outer rim (9) of a helical web (4) has a width (B) in a range from one/eighth to one/sixth of a radius (R) of the envelope circle (8).

6. A rotary-percussion drill shaft according to claim 1, wherein a radially outer rim (9) of a helical web (4) coincides with an arc of the envelope circle (8).

7. A rotary-percussion drill shaft according to claim 6, wherein a web flank (10) between the concave groove bottom (5) and the radially outer rim-forming-envelope circle arc (9) is formed convex.

8. A rotary-percussion drill shaft according to claim 7, wherein the groove bottom (5) smoothly passes into the flank (10).

9. A rotary-percussion drill shaft according to claim 7, wherein the flank (10) has a flank radius (F) in a range from one/fourth to a half of a radius (H) of the envelope circle (8).

10. A rotary-percussion drill shaft according to claim 1, wherein a helical web (4) has, with respect to a drill axis (A), a lead ($\alpha$) in a range from 45° to1 55°.

\* \* \* \* \*